W. R. HALFPENNY.
TIRE.
APPLICATION FILED JULY 8, 1921.

1,422,851.

Patented July 18, 1922.

Inventor
W. R. Halfpenny,
By C. A. Snow & Co.
Attorney

UNITED STATES PATENT OFFICE.

WILLIAM R. HALFPENNY, OF JUNIATA, PENNSYLVANIA.

TIRE.

1,422,851. Specification of Letters Patent. Patented July 18, 1922.

Application filed July 8, 1921. Serial No. 483,293.

*To all whom it may concern:*

Be it known that I, WILLIAM R. HALFPENNY, a citizen of the United States, residing at Juniata, in the county of Blair and State of Pennsylvania, have invented a new and useful Tire, of which the following is a specification.

This invention relates to vehicle tires, one of its objects being to provide a resilient tire which does not require inflation but includes means whereby an ordinary tire casing can be held distended but free to yield slightly when subjected to a load, thus to absorb jars.

Another object is to provide a tire of this character which can be connected readily to the ordinary form of wheel rim.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings—

Figure 1:
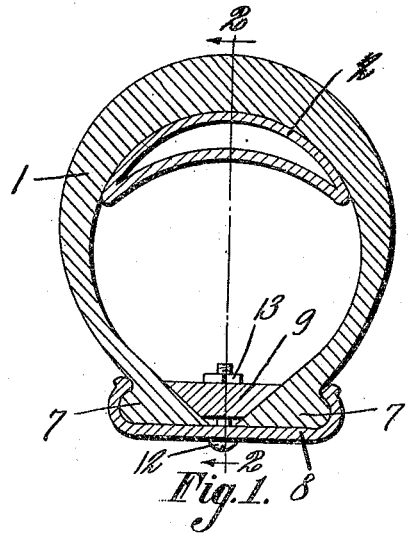
Figure 1 is a transverse section through the tire.
Figure 2:
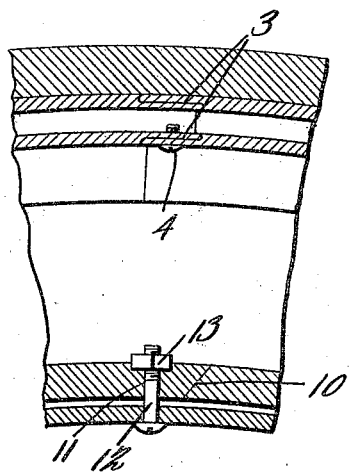
Figure 2 is a section on line 2—2, Figure 1.
Figure 3:
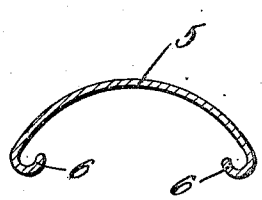
Figure 3 is a section through a modified form of distending spring.

Referring to the figures by characters of reference 1 designates a tire casing of the usual construction and extending annularly within this casing along the tread portion thereof is a distending spring ring 2 bowed transversely as shown and having its ends interfitting as at 3 and held together by one or more screws 4 or the like. This distending spring ring can be crescent shaped as shown and hollow or, if preferred, it can be solid and transversely bowed as shown at 5 in Figure 3, the side portions being curled or rolled inwardly to form annular beads 6.

The bead portions 7 of the casing are adapted to be placed in engagement with a rim 8 of the usual construction, a tie ring 9 being first placed within the casing and around the rim. This tie ring has its ends beveled as shown at 10 and adapted to contact and the sides of the ring are also beveled so as to fit snugly against the side portions of the casing between the beads. Bolt openings 11 are formed in the ring at intervals to receive bolts 12 extending through the rim 8.

In using the device the spring ring 2 is placed within the casing and expanded until its ends properly interfit after which they are secured together. The ring 9 is then placed in the casing and the beads 7 placed against the rim 8 and in engagement with the flanges on the rim. Screws 12 are then successively inserted through the rim into the ring 9 and into engagement with the nuts 13 mounted in the ring, these bolts when tightened serving to draw the ring 9 toward the rim 8. Thus the ring will act as a wedge and bind the beads 7 to the flanges on the rim. The casing 1 will thus be held under tension but the spring ring 2 will be free to yield when the tire passes over an obstruction or is subjected to sudden jolts. Thus an ordinary casing can be used without requiring an inflatable inner tube.

What is claimed is:—

A vehicle tire comprising a casing having rim engaging means, and a spring ring crescent-shaped in cross section and having detachably connected interfitting ends, said spring ring being seated in the casing against the tread portion thereof.

In testimony that I claim the foregoing as my own, I have hereto affixed my signature in the presence of two witnesses.

WILLIAM R. HALFPENNY.

Witnesses:
J. W. MYERS,
A. B. AMMERSMAN.